United States Patent [19]

Kuwakado et al.

[11] 4,076,277
[45] Feb. 28, 1978

[54] GAS COLUMN TYPE AIR BAG SYSTEM

[75] Inventors: Satosi Kuwakado, Nishio; Takao Kasagi, Tokai; Toshihiro Takei, Okazaki, all of Japan

[73] Assignees: Nippon Soken, Inc., Nishio; Arakawa Autobody Co., Ltd., Toyota, both of Japan

[21] Appl. No.: 637,184

[22] Filed: Dec. 3, 1975

[30] Foreign Application Priority Data

Dec. 9, 1974 Japan .................................. 49-141925

[51] Int. Cl.$^2$ ............................................ B60R 21/08
[52] U.S. Cl. ....................................... 280/738; 280/743
[58] Field of Search ......................... 280/738, 729, 743

[56] References Cited
U.S. PATENT DOCUMENTS 3,784,225  1/1974  Fleck ..................................... 280/729
3,843,150  10/1974  Harada ................................. 280/729

Primary Examiner—Joseph F. Peters, Jr.
Assistant Examiner—John P. Silverstrim
Attorney, Agent, or Firm—Cushman, Darby & Cushman

[57] ABSTRACT

A gas column type air bag system of the type in which an air bag includes a main gas column with a relatively large volume when inflated and a plurality of auxiliary gas columns with a relatively small volume when inflated, branched from the main column and extended toward a passenger, thereby rapidly expanding the air bag to inflate in case of a collision. The ratios both in volume and length among the air bag and the main and auxiliary gas columns are so selected that the air bag may be almost instantaneously expanded to the full by the inflation of the main and auxiliary columns and may be securely maintained in the desired stable inflated shape. The inflated main column serves as a knee restraining pad. The high pressure gas requirement for inflating the air bag may be considerably reduced as compared with the conventional systems.

3 Claims, 4 Drawing Figures

FIG. 1
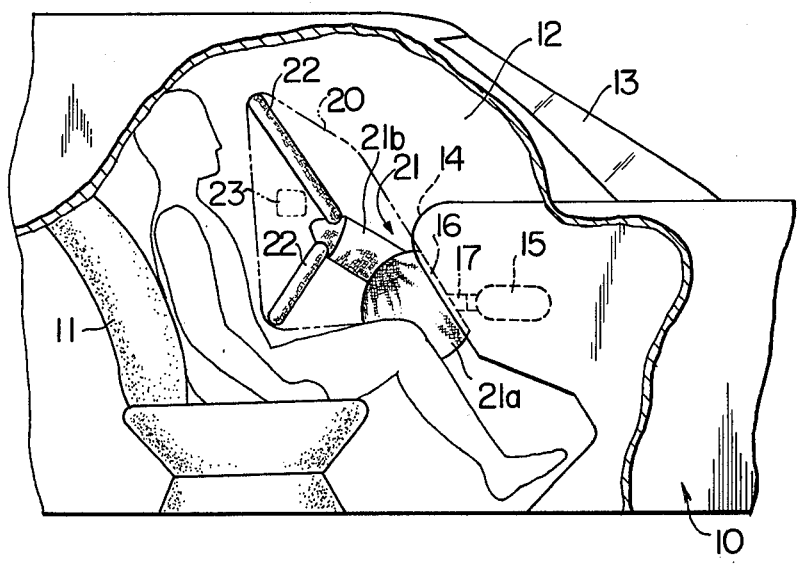
FIG. 2
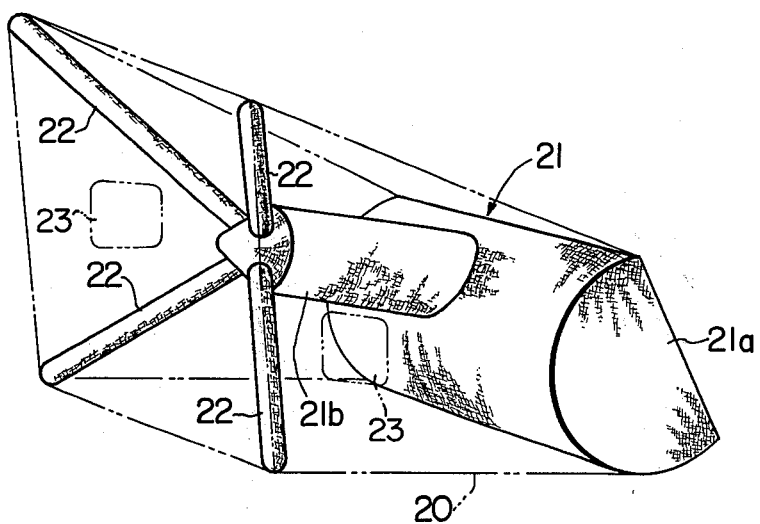
FIG. 3
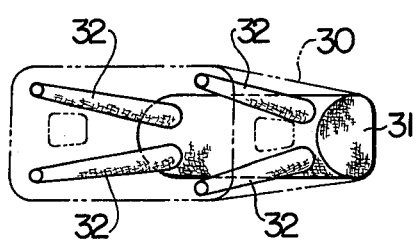
FIG. 4

GAS COLUMN TYPE AIR BAG SYSTEM

BACKGROUND OF THE INVENTION

The present invention relates to generally an air bag system for protecting the passengers on an automotive vehicle in case of a collision, and more particularly a gas column type air bag which is a cushion device for an air bag system.

In the prior art gas column type air bag system, a plurality of elongated gas columns incorporated in an air bag are inflated with the high pressure gas supplied from a high pressure gas container which is opened in response to the signal from sensors for detecting the collision of the vehicle so that the normally folded air bag is expanded sucking the surrounding air therein, thereby restraining the occupant or passenger. The prior art air bag system of the type described has a distinct defect that the elongated gas columns tend to vibrate when inflated so that the expanded air bag may not be maintained in the desired shape. Another defect is that the time required for fully expanding the air bag is relatively longer so that the formation of the restraint for the occupant is delayed. When the length of the gas columns is made shorter in order to reduce the time required for fully expanding the air bag, the length of the air bag is also reduced too short to provide a sufficient restraint. When the cross sectional area of the gas columns is increased in order to minimize the vibration thereof, the quantity of the high pressure gas required for fully inflating them is inevitably increased with the result of the increase of volume of the high pressure gas container.

In order to prevent the bumping of the knees of the passenger against any part of the automotive body in case of a collision, the so-called knee bag or pad must be provided, but the incorporation of such knee bag or pad into the air bag makes the design of the air bag very complex and is therefore difficult in practice. Even when the knee bag or pad is incorporated, an increase in cost results. In case of the conventional air bag without gas columns of the type which is inflated by the high pressure gas directly flowing therein, the knee bag or pad may be readily provided, but the high pressure gas container with a large volume must be provided in order to supply the high pressure gas for inflating both the air bag and the knee pad. Furthermore, the inflation time becomes longer so that the restraint cannot be provided in time.

SUMMARY OF THE INVENTION

The present invention was therefore made in order to overcome the above and other defects encounted in the prior art gas column type air bag systems.

Briefly stated, the air bag system in accordance with the present invention includes a main gas column with a relatively greater cross sectional area and a plurality of auxiliary gas columns with a relatively small cross sectional area branched from the main column and adapted to be inflated and extended so as to fully expand an air bag. Therefore, the main and auxiliary gas columns may rapidly expand the air bag with the greater force.

One of the objects of the present invention is therefore to provide a gas column type air bag system which may rapidly expand an air bag with the greater expanding force.

Another object of the present invention is to provide a gas column type air bag system of the type in which an air bag includes a main gas column adapted to inflate into a relatively large volume along the portion at which the air bag is attached to the automotive body and a plurality of auxiliary gas columns branched from the main gas column so that in case of a collision the air bag may be rapidly expanded to inflate for restraining not only the upper half of the body but also the knees of an occupant.

A further object of the present invention is to provide a gas column type air bag system which may expand an air bag to inflate fully with the smaller quantity of high pressure gas as compared with the prior art air bag systems.

The above and other objects, features and advantages of the present invention will become more apparent from the following description of some preferred embodiments thereof taken in conjunction with the accompanying drawing.

BRIEF DESCRIPTION OF THE DRAWINGS

FIG. 1 is a schematic view of a first embodiment of a gas column type air bag system in accordance with the present invention, the air bag being shown as being fully expanded and inflated;

FIG. 2 is a perspective view of the inflated air bag and gas columns thereof; and FIGS. 3 and 4 are perspective views of a second and third embodiments of the air bag of the present invention.

DESCRIPTION OF THE PREFERRED EMBODIMENTS

First Embodiment, FIGS. 1 and 2

Referring to FIGS. 1 and 2, an automotive body 10 has a compartment 12 which is defined in part by a windshield 13 and an instrument panel 14 and in which is installed a front seat 11. A gas source 15 of known type, such as a gas generator or a container filled with a high pressure gas, is mounted under the instrument panel 14 and behind a base wall 16 thereof, and is operatively coupled to suitable sensors (not shown) adapted to sense the impact of a collision or the abrupt change in speed, thereby opening the gas source 15. The gas source 15 is communicated through a conduit 17 with a gas inlet hole (not shown) formed through the base wall 16.

A bag generally designated by 20 and inflated in case of a collision to protect an occupant, is made of plain weave fabric of nylon and has a volume of the order of 150 to 230 liters when inflated. The opened end of the bag 20 is attached to the base wall 16 in a conventional manner, and conventional suction valves 23 for sucking the air in the compartment when the bag 20 is inflated are fitted to the bag 20. Alternatively, the suction valves may be attached to the base wall 16 in such a way that the air in the compartment 12 may be sucked into the bag 10 when the latter is inflated.

Referring particularly to FIG. 2, the bag 20 includes a main gas column 21 consisting of a first main column 21a and a second main column 21b. Both the first and second main columns 21a and 21b are made of air-tight and foldable plain weave fabric of nylon and are jointed to each other by sewing in such a way that the second main column 21b may be extended from the first main column 21a toward the occupant when inflated.

When the bag 20 is inflated, four auxiliary gas columns 22 made of fabric similar to that of the main columns 21a and 21b are equiangularly extended backwardly outwardly toward the occupant from the cone-shaped free end portion of the second main column 21b. The leading end of each auxiliary column 22 is sewn on each vertex of the bag 20.

The bag 20 including the main columns 21 and auxiliary columns 22 is normally folded compact, but when the gas from the gas source 15 is forced into the bag 20 through the inlet of the base wall 16, both the main and auxiliary columns 21 and 22 are inflated to expand the bag 20 as shown in FIGS. 1 and 2.

The total volume of the main and secondary columns 21 and 22 is relatively small and is of the order of 20 to 40 liters which is sufficient enough for fully expanding the bag 20 of 150 to 230 liters. The ratio between the cross sectional areas of the main and auxiliary columns 21b and 22 is preferably of the order of 1 : 1.5 to 1 : 2.5 and more preferably 1 : 2. For instance, the second main column 21b has a circular cross section with a diameter of 160 mm while the auxiliary column 22 also has a circular cross section of a diameter of 80 mm. The ratio between the length of the second main column 21b from the base wall 16 to the free end of the column 21b and the length of the auxiliary column 22 is preferably between 1.2 : 1 and 1.8 : 1 and more preferably 1.5 : 1. For instance, the lengths of the main and auxiliary columns 21b and 22 are 560 mm and 380 mm, respectively. The above ratio in length may be, of course, changed depending upon the desired shape of the inflated bag 20. When the ratio in length is selected from the above range, the inflation time of the bag 20 may be considerably reduced, and the vibrations of the main and auxiliary columns may be prevented, thus ensuring the positive stable and full expansion of the bag 20.

The opening end of the first main column 21a is communicated with the gas inlet of the base wall 16 in a suitable manner so that the gas from the gas source 15 may flow into the main column 21a in case of a collision. When the first main column 21a is inflated, it serves to securely restrain the knees of the occupant. The auxiliary columns 22 and the second main column 21b serve to expand the bag 20, thereby securely restraining the occupant.

Next the mode of operation will be described. In case of a collision, in response to the signal from the sensors, the gas source 15 is opened or ignited so that the high pressure gas flows through the conduit 17 into the main column 21 to inflate it as shown in FIGS. 1 and 2 so that the first main columns 21a may securely restrain the knees of the occupant. Therefore, the so-called "submarine phenomenon" may be eliminated, and the occupant's knees are prevented from bumping against the undersurface of the instrument panel 14. The inflation of the second main column 21b causes the expansion of the bag 20 toward the occupant while the inflation of four auxiliary columns 22 causes the bag 20 to be rapidly fully inflated. As the bag 20 is inflated, the pressure therein drops so that the surrounding air flows through the suction valves 23 into the bag 20, thereby ensuring the rapid and full inflation of the bag 20. Since the auxiliary columns 22 are joined to the vertexes of the bag 20 which are most outwardly extended, the bag 20 may be inflated into the desired shape, thereby restraining the upper half of the body of the occupant. Thus the rebounding of the occupant may be positively prevented.

The inflated main column 21, which restrains the knees of the occupant, has a relatively large volume so that it may securely support the bag 20 with the greater holding force. Since the four auxiliary columns 22 branched from the second main column 22b have a relatively small volume, they may be almost instantaneously inflated so that the bag 20 may be also very rapidly expanded fully. Thus the present invention provides a gas column type safety air bag which is very rapidly and positively inflated by the inflation of the main and auxiliary columns 21 and 22. It should be noted that the bag 20 may be inflated by the inflation of the main and auxiliary columns with the total inflated volume being less than about 20% of the volume of the inflated bag 20. As a result, the quantity of the gas supplied from the gas source 15 for inflating the bag 20 may be considerably reduced as compared with the prior art safety bag systems.

SECOND EMBODIMENT, FIG. 3

The second embodiment shown in FIG. 3 consists of one main column 31 and four auxiliary columns 32 branched from the main column 31 for inflating a bag 30.

THIRD EMBODIMENT, FIG. 4

The third embodiment shown in FIG. 4 consists of one main column 41 and two flat box-shaped or wedge-shaped auxiliary columns 42 branched from the main column 41 for inflating a bag 40.

The mode of operation of both the second and third embodiments is substantially smilar to that of the first embodiment.

As described above, according to the present invention, the air bag may positively restrain both the knees and upper half of the body of the occupant when the bag is inflated in case of a collision. Furthermore the air bag system is very simple in construction, and may be inflated by the gas the quantity of which is considerably smaller as compared with the conventional air bag systems. Since the air bag system is of the gas column type, the diffuser which is the essential component of the prior art air bag system may be eliminated. Furthermore, only one gas source is required for rapidly and fully inflating the air bag to the desired shape.

What is claimed is:

1. A gas column air bag system for restraining an occupant in a vehicle having a compartment, upon collision of the vehicle compartment, comprising:

a gas source for supplying a high pressure gas in case of said collision;

inflatable bag means adapted for being mounted in said compartment said bag means having a bag wall;

means defining a first gas column provided inside said inflatable bag means for expansion by the high pressure gas from said gas source and adapted to be mounted in said compartment said first gas column being expansible to a relatively large volume and effective to restrain when expanded, the knees of the occupant;

means defining a second gas column of relatively large diameter extending from a substantially axially central portion of said first gas column and having an outer end, said second gas column being expansible within said inflatable bag means toward the occupant concurrently with said first gas column; and four third gas columns extending from the outer end of said second gas column in four diverging directions and having diameters smaller than the diameter of said second gas column, each said third gas column having an outer end jointed in each corner portion of the bag wall and being expansible concurrently with said first and second gas columns; and means for drawing air in said compartment of the vehicle into the interior of said bag means when said bag is expanded by said columns, thereby enabling said bag means to restrain the torso of the occupant.

2. A gas column type air bag system as defined in claim 1, wherein said second gas column has a conical outer end, and from this conical outer end are branched said third gas columns.

3. A gas column air bag system for restraining an occupant in a vehicle having an interior compartment, upon a collision of the vehicle compartment comprising:

a gas source for supplying a high pressure gas in case of said collision;

inflatable bag means adapted for being mounted in said compartment said bag means having a bag wall;

a knee gas column provided inside said inflatable bag means for expansion by the high pressure gas from said gas source and adapted to be mounted in said compartment said knee gas column being expansible to a relatively large volume and effective to restrain, when expanded, the knees of the occupant; and a main torso gas column branched from a substantially axially central portion of said knee gas column and having a predetermined diameter and a conical outer end, said main gas column being expansible within said inflatable bag means toward the occupant concurrently with said knee gas column;

a plurality of auxiliary torso gas columns extending divergently outwardly from the conical outer end of said main gas column for concurrent expansion therewith, each auxiliary gas column having a diameter of 1/1.5 to 1/2.5 of the diameter of said main gas column and an outer end connected to each corner portion of said bag wall of said inflatable bag means; and means for drawing air in said compartment into the interior of said bag means that when said bag means is expanded by said columns, thereby enabling said inflatable bag means to restrain the torso of the occupant.

* * * * *